Sept. 24, 1963  J. JAMES ETAL  3,104,911
AUTOMATIC SWIVEL SEAT
Filed Sept. 7, 1960  4 Sheets-Sheet 4
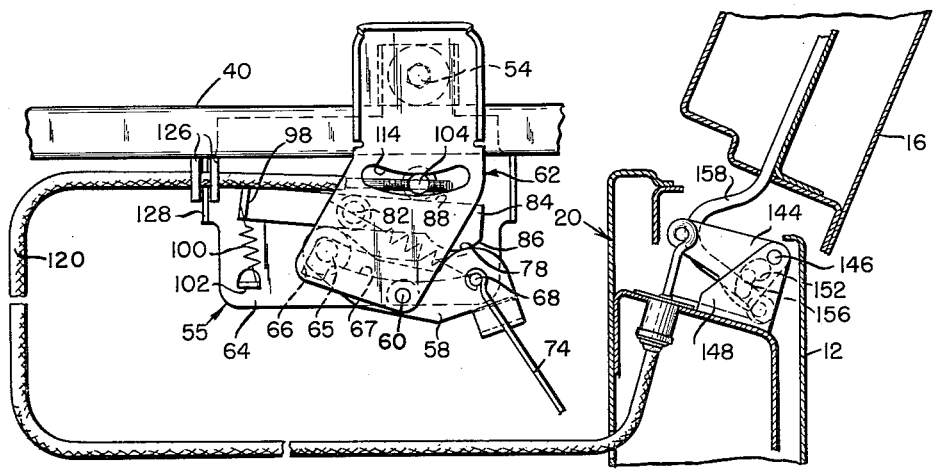
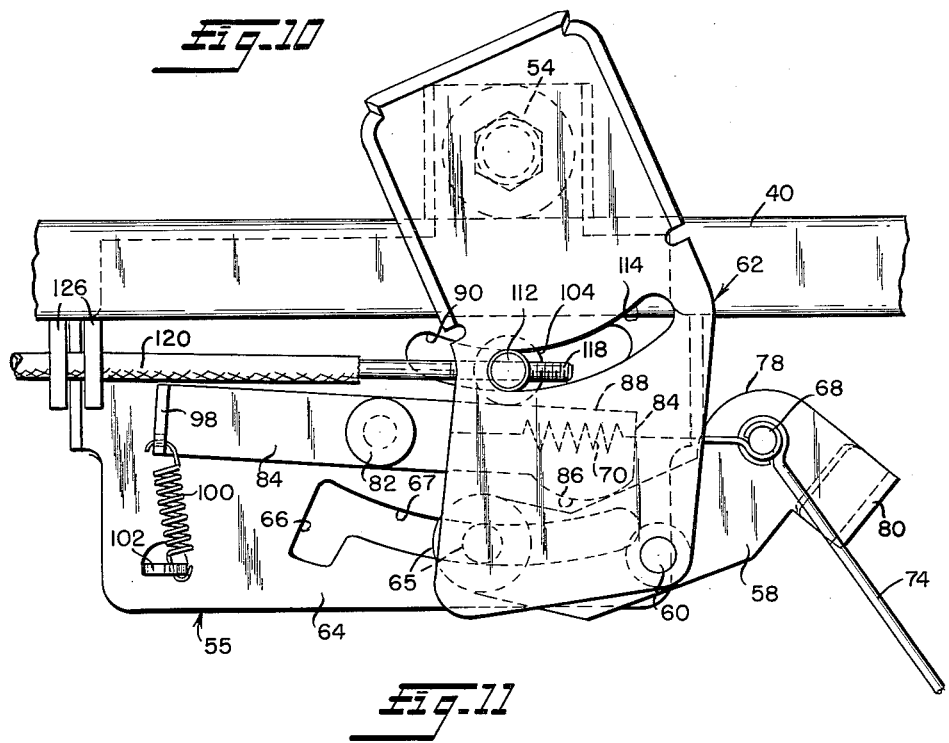
INVENTORS
Jimmie James
Elmer A. Herider
BY
ATTORNEYS

United States Patent Office 3,104,911
Patented Sept. 24, 1963

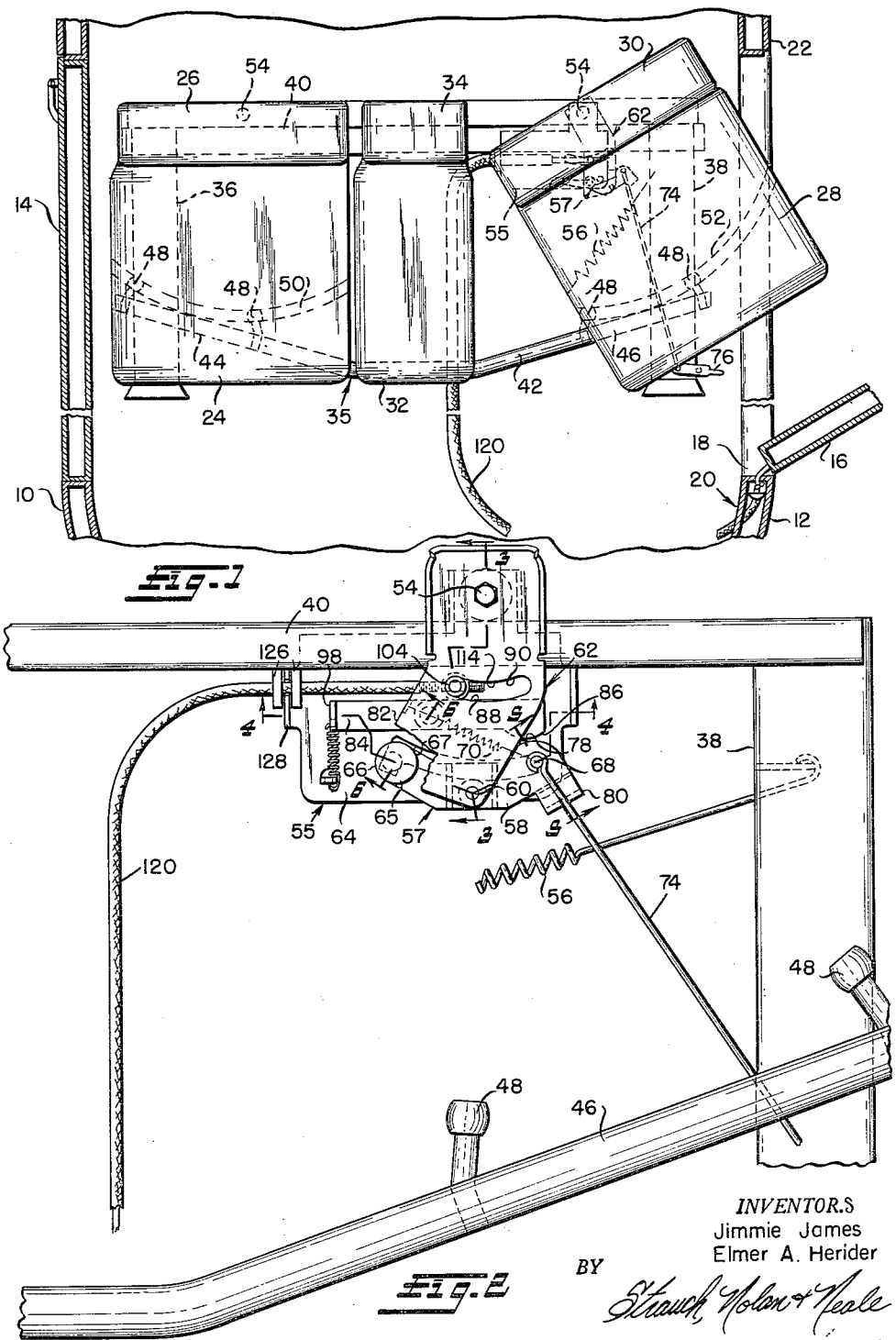

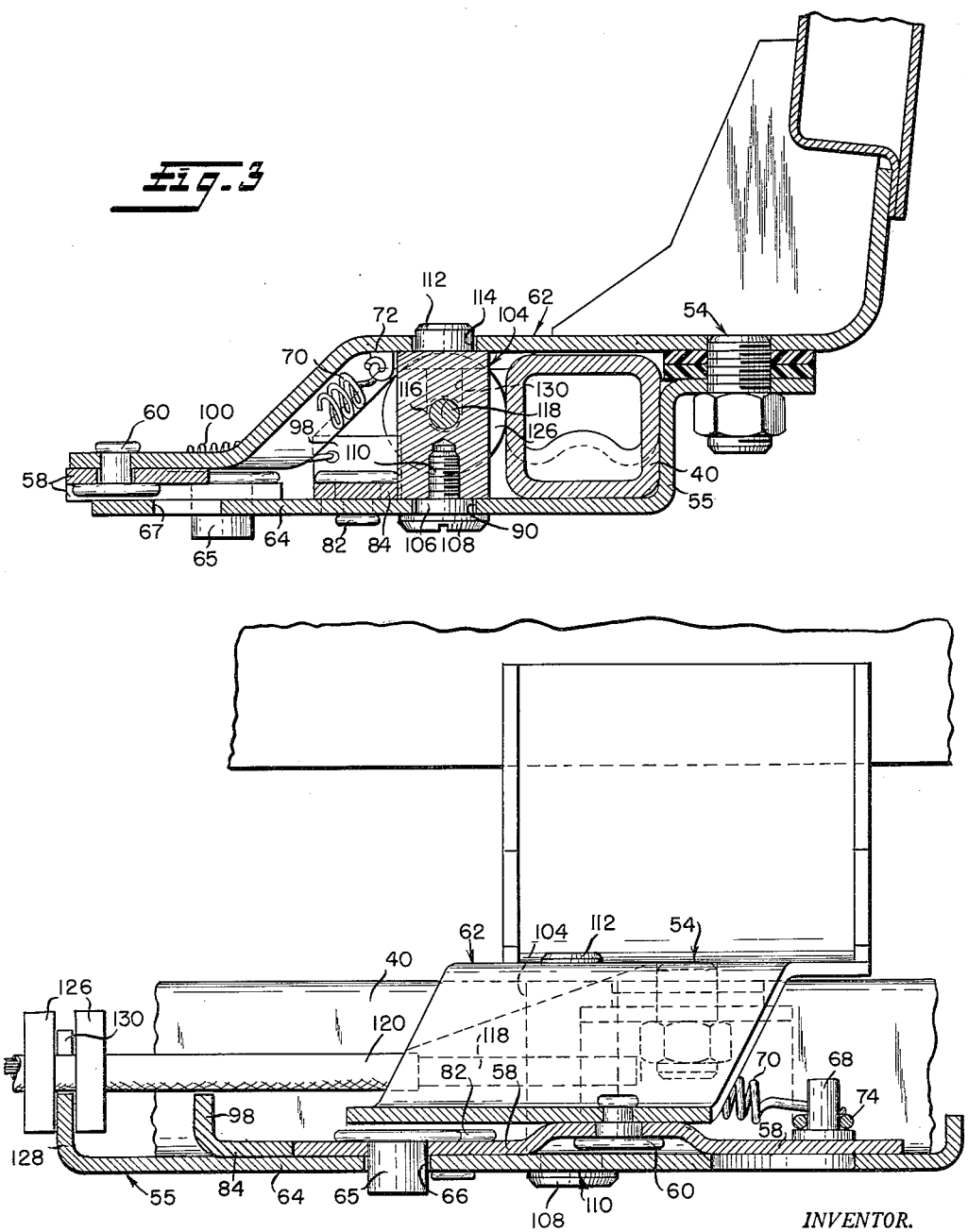

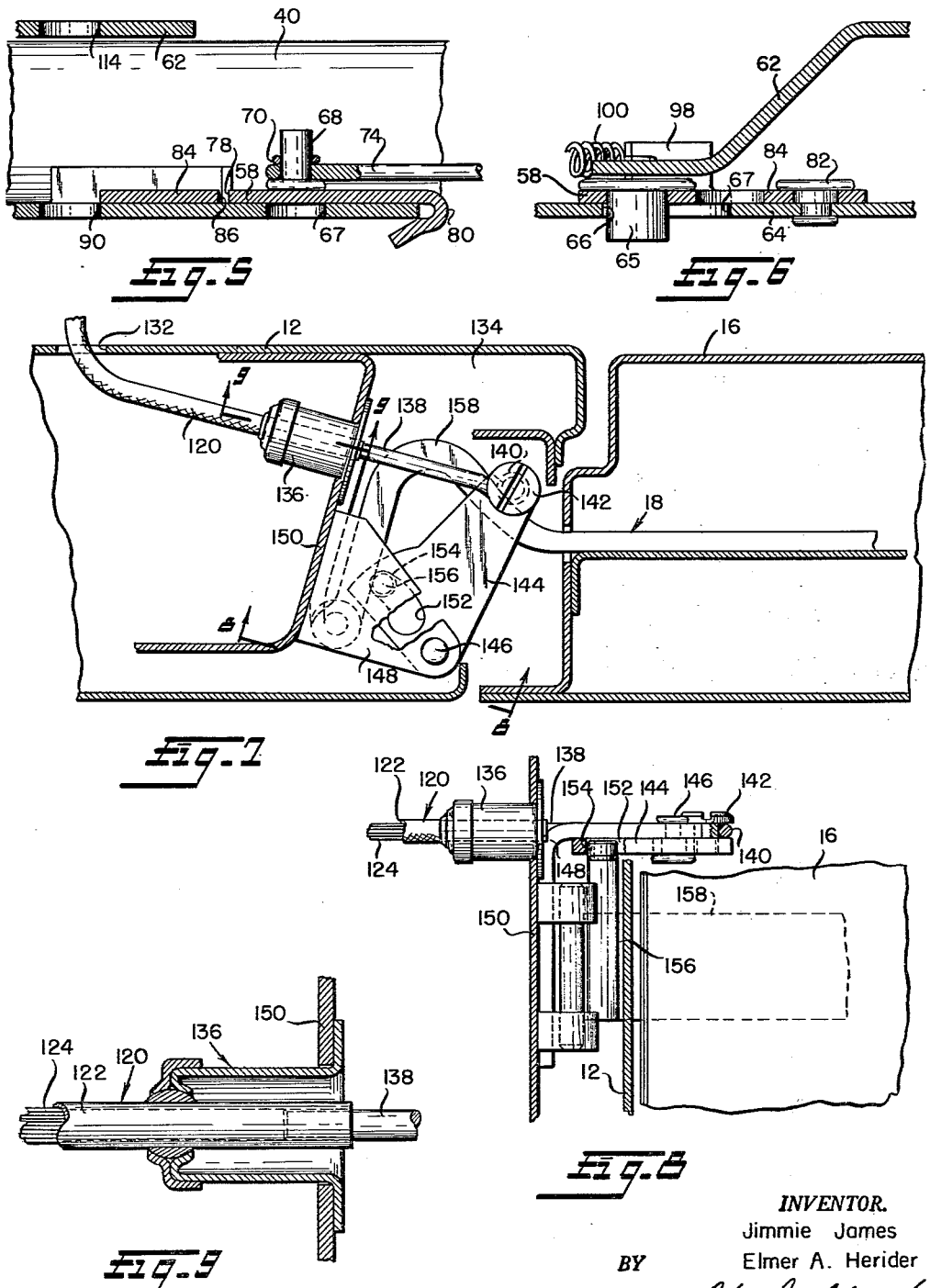

---

3,104,911
AUTOMATIC SWIVEL SEAT
Jimmie James, Madison Heights, and Elmer A. Herider, Dearborn, Mich., assignors to Rockwell-Standard Corporation, Coraopolis, Pa., a corporation of Pennsylvania
Filed Sept. 7, 1960, Ser. No. 54,420
7 Claims. (Cl. 296—68)

The present invention relates in general to automobile seats and more particularly to improvements in swivel-mounted front seats for passenger vehicles.

Swivel-mounted front seats for passenger vehicles facilitate the entrance and exit of the passenger or driver into or out of the automobile and also permit a more convenient access for the passengers into the rear compartment of a two-door automobile.

Such swivel seats are mounted on an offset pivot to swing around and along a curved track and through the adjacent door. Alternately they are mounted on a central pivot pin or turntable to rotate rather than swing toward the door opening. The first mentioned construction is preferred inasmuch as the swinging movement displaces the seat outwardly so that the front border of the seat partly extends through the opened door allowing a person to sit down conveniently and swing the seat back into the automobile.

In most instances the turn or swivel seats are locked in their straight forward position to prevent accidental swiveling of the seat when the vehicle is in motion. Such locks must be released manually in order to allow swiveling of the seat.

To overcome the necessity for manually unlocking the seat and to further improve swivel seat applications for passenger vehicles, the present invention provides a mechanism which automatically swivels the seat outwardly as the door is being opened and pivots the seat inwardly as the door is being closed to make the swivel seat more convenient and attractive to the public.

The automatic actuators of the present invention are of simple, low cost construction and comprise but few parts which can be installed readily in existing units and which require a minimum of maintenance and which have an extended trouble-free service life. The mechanism includes a push-pull cable which effectively connects the door to the seat lock mechanism to unlock the seat to thereby permit the seat to swivel outwardly as the door is being opened and which positively swings the seat inwardly as it is being closed.

Accordingly, it is an object of the present invention to provide in automobile swivel seats an automatic actuator mechanism which is connected to the automobile door and to the seat to allow the seat to swing out automatically as the door is being opened and to swing the seat in as the door is being closed.

Another object of the present invention is to provide in an automobile swivel seat mechanism a push-pull type cable connected at one end to the automobile door and at the other end to the swivel seat mechanism which is adapted to convey mechanical motion from the door to the swivel seat mechanism in order to cause the seat to swing outwardly or inwardly respectively.

A further object of the present invention is to provide an automobile swivel seat mechanism equipped with a self-locking device and tension spring, a push-pull type cable attached to the door and associated mechanism effective to unlock the seat as the door is being opened to permit the tension spring to swing the seat outwardly through the open door.

A still further object of the present invention is to provide an automatic swivel seat mechanism of simple construction and relatively low cost which can be easily installed in existing swivel seat mechanisms.

These and other objects and features of the present invention will become apparent as the description proceeds in connection with the accompanying drawings in which:

FIGURE 1 is a schematic top plan view of the front seat section of an automobile embodying the present invention showing one seat swivelled outwardly;

FIGURE 2 is an enlarged fragmentary top plan view of part of the automatic swivel mechanism with the seat removed for clairity;

FIGURE 3 is a section through the pivot and release mechanism along line 3—3 of FIGURE 2;

FIGURE 4 is a transverse section of the lock mechanism substantially along line 4—4 of FIGURE 2;

FIGURE 5 is another cross-section through part of the lock mechanism along line 5—5 of FIGURE 2;

FIGURE 6 is still another section through parts of the lock mechanism substantially along line 6—6 of FIGURE 2;

FIGURE 7 is a fragmentary top plan view of the door operated mechanism partly in section;

FIGURE 8 is a side view of the door mechanism of FIGURE 7 looking in the direction of arrows 8—8;

FIGURE 9 is an enlarged cross-section through the ball and socket cable connection of the door mechanism along line 9—9 of FIGURE 7;

FIGURE 10 is a fragmentary schematic top plan view of both the seat and door mechanism illustrating the operation of the mechanism as the door is being opened; and FIGURE 11 is an enlarged fragmentary top plan view of the seat mechanism alone illustrating the swivel action of the mechanism.

Although the present invention is illustrated as applied to a swivel seat construction as disclosed in copending application Serial No. 641,183, filed February 19, 1957 for Vehicle Seat Construction, now Patent No. 2,958,369, it shall be understood that it may be incorporated in other swivel seat mechanisms, for instance as disclosed in our copending applications Serial No. 721,952, filed March 17, 1958, now abandoned, and Serial No. 833,823, filed August 14, 1959 for Swivel Seat Construction, now Patent No. 3,066,978.

It shall further be noted that, although the invention is shown installed on the left hand seat only, the right hand seat may incorporate a similar mechanism, the parts being reversed from left to right. Inasmuch as the parts are alike, it will suffice to describe only one form.

Referring now to FIGURES 1 and 2 there are illustrated the interior front part of an automobile comprising in general the outside body walls 10 and 12 of an automobile body of the two-door type having doors 14 and 16 hinged at their forward end at 18 to a front post 20 and adapted to engage a rear post 22 in closed position.

The front seats are in this instance composed of three independent sections which include a right hand outer swivel seat 24 having a foldable back rest 26 and left hand outer swivel seat 28 having a similar back rest 30. Interposed between both outer seats is a stationary intermediate seat section 32 with a folding backrest 34 to accommodate a third passenger. When there are only two occupants in the front seat the backrest 34 may be folded down to provide a convenient arm rest for the occupants to the left and right thereof or the intermediate seat section may be entirely disposed of if desired.

All seat sections 24, 28 and 32 are supported on a common integral sliding subframe assembly 35 comprised of side frame members 36 and 38, a tubular rear rail 40 and a tubular front rail 42, the outer ends 44 and 46 of which extend rearwardly at an angle. Subframe 35 is designed to enable the entire front seat assembly to slide longitudinally of the automobile toward the rear or front by means of any well known seat adjusting mechanism (not shown).

The rearwardly angled outer sections 44 and 46 of front rail 42 which overlap the side rails 36 and 38 are provided with rotatable rollers 48 extending rearwardly therefrom and supporting the outer seat sections 24, 28. Seats 24 and 28 are provided on their bottom surfaces with complementary curved race tracks 50 and 52 which comprise U-shaped rails to receive the rollers 48. The seats are thus adapted to swing outwardly along a predetermined arc through the adjacent opened car door as illustrated at the left hand seat in FIGURE 1.

The center of the arc through which the seats 24 and 28 swing is determined by a rear pivot pin assembly 54 offset inwardly from the center of the seat and supported on a bracket 55 attached to the rear rail 40. To assist the outwardly swinging movement of the front outer seat sections a tension coil spring 56 is provided which is angularly positioned underneath the seat 28 extending from the seat inner side frame member to the side frame member 38 and which in its normal position is placed under tension. The force of spring 56 is such that it can be easily overcome on the return movement of the seat 28 to its normal position.

The seats are automatically locked in the normal straight ahead position of the seats as illustrated by the right hand seat 24 in FIGURE 1 to prevent accidental swivel action by means of a lock mechanism indicated generally at 57 and which is supported on and part of the bracket 55. The lock comprises a pivotable catch bracket 58 centrally secured as by rivet 60 underneath the forward end of a swivel bracket 62 which, as shown in FIGURE 3, is integral with the seat and pivots about pin 54. Catch bracket 58 is thus suspended between the stationary support bracket 55 and the lower forwardly extending portion of swivel bracket 62 (FIGURES 3 and 4).

The catch bracket 58 is provided at one end with a pin 65 which normally, in the seat locked position, extends downwardly into a pocket 66 of an arcuate slot 67 in the front base 64 of the support bracket 55 (FIGURES 2 and 11). The center of the radius along which the arcuate catch lock slot 67 extends is the pivot assembly 54 and the slot is provided to allow the swivel bracket and catch to rotate with the seat upon actuation. The other end of the catch bracket 58 is provided with an upwardly projecting pin 68 (FIGURES 4 and 5) which serves as anchor for a tension spring 70, the other end of which is secured at 72 (FIGURE 3) to the underside of the swivel bracket 62. Tension spring 70 returns the pin 65 to the pocket 66 and holds it there unless an opposite force is applied to the catch bracket 58 as will be explained. The pin 68 holds also a release wire 74, the other end of which is attached to a pivoted hand lever 76 (FIGURE 1) secured to the front end of side frame member 38. Pushing the hand lever 76 rearwardly tensions the release wire 74 which causes the catch bracket 58 to swing around its pivot 60 in a clockwise direction as viewed in FIGURE 2 thereby displacing the lock pin 65 out of the pocket 66 and into the slot 67 allowing the seat to swivel outwardly.

The inner end of the catch bracket 58 at the spring retaining end is provided with an arcuate cam face 78 for a purpose to appear. Opposite the cam face 78 the catch bracket 58 is provided with a wrapped around section 80 (FIGURE 5) adapted to extend underneath one corner of the support bracket 55 to prevent chatter in the mechanism.

Manually releasing the catch lock as described above permits the tension coil spring 56 to retract and rotate the seat 28 outwardly through the opened door around the arc described by the race track 52 to the position shown in FIGURE 1. The driver of the vehicle can now seat or unseat himself conveniently outside of the car whereafter the seat 28 is swivelled back to its normal position in which it will be automatically locked by means of the lock mechanism 57, just described.

It frequently happens that occupants of the vehicle forget to use the seat swivel mechanism or find it inconvenient to have to release the seat. Thus it is desirable to swing the seat out automatically as the vehicle door is being opened. To this end the following mechanism is provided.

Pivotally mounted substantially centrally of the forward base 64 by a pin 82 is a release lever 84 which has at one end an arcuate camming surface 86 normally positioned opposite the cam face 78 of the catch bracket 58 and adapted to cooperate therewith in the release of the catch as will be explained. The straight side 88 of release lever 84 normally projects slightly rearwardly of the front edge of an arcuate slot 90 formed in base 64 concentric with pin 54 as shown in FIGURE 2 for a purpose to appear.

The other end of release lever 84 is provided with a flange 98 to which a tension spring 100 is attached. The other end of tension spring 100 is secured to a spring retaining bracket 102 which may be welded on top of the forward base 64 of bracket 55. Spring 100 is provided to rotate release lever 84 in a direction away from the catch bracket 58 and against an actuating pin or stud 104 disposed between the support bracket 55 and swivel bracket 62 and adapted to travel along the curved path provided by the slot 90 upon actuation. To this end the pin 104 is provided with a reduced diameter bearing portion 106 at its lower end which slides in lower slot 90 of the support bracket 55 whereas the enlarged body portion of the pin 104 slides along the surface of bracket portion 64 at the opposite sides of the slot 90 as illustrated in FIGURE 3. The head 108 of screw 110 threaded into the pin 104 abuts the underside of the support bracket 55 and aligns the pin 104. Another reduced diameter bearing portion 112 is provided at the upper end of the pin 104 and extends into and through an arcuate slot 114 in swivel bracket 62 directly above and coinciding with slot 90.

The actuator pin 104 is provided with transverse internal threads 116 substantially centrally thereof to be attached to the screw rod end 118 of a flexible push-pull cable assembly indicated generally at 120. The push-pull cable 120 may comprise a flexible stationary outer shell 122 of rubber, vinyl or any other flexible material and an inner core 124 (FIGURES 2, 4, 8 and 10) which may be a tightly wound bundle of wire strands and to which one end the said screw rod 118 is attached. The outer shell 122 of push-pull cable 120 is securely attached by means of two clamping flanges 126 to a side flange 128 of the support bracket 55 which to this end is provided with a vertical slot 130 (FIGURES 3 and 4) to allow the cable 120 to be inserted therein.

It will be noted from FIGURE 4 that the position of the cable 120 is such that it clears the flange 98 of release lever 84 during rotation of the latter as illustrated in FIGURE 10.

Upon reciprocatory actuation of the pin 104 by means of cable 120 in either direction the actuator pin 104 travels along the curved slots 90 and 114 thereby striking the side face 88 of the release lever 84 which causes the lever 84 to swivel upon pin 82 against the force of the spring 100. The curved cam face 86 abuts cam face 78 of the catch bracket 58 rotating the latter to pull the lock pin 65 out of its pocket 66 of the complimentary slot 67 as shown in FIGURE 10. The seat 28 is now free to rotate due to the influence of spring 56 (FIGURES 1 and 2) which swings the seat outwardly on pivot 54 to a position shown in FIGURE 1.

Automatic actuation of the release mechanism is accomplished by the following mechanism shown in FIGURES 7 to 9. The terminal end of the cable 120, which runs underneath the seat frame and preferably underneath the floor board of the automobile, extends through an opening 132 in the automobile side wall 12 near the door pillar 134 and into the pillar through a ball joint assembly 136 (FIGURE 9) provided to allow a limited swivel action of the cable. The terminal end, which comprises a rod 138 having an eye 140 at its end, is pivotally connected inside the pillar 134 to a pin 142 on the end of a cam lever 144 rotatably secured at 146 to a bracket 148 bolted or otherwise secured to an internal wall 150. The cam lever 144 is provided near its pivot point 146 with an arcuate cam notch 152 which is engaged by a roller 154 of a pin 156 welded to the door hinge 158 of the door 16.

The automatic seat actuator mechanism operates as follows:

When the front door 16 of the automobile is opened the roller 154 on the door hinge 158 inside the cam notch 152 rotates the cam lever 144 counterclockwise as viewed in FIGURES 7 and 10, thereby exerting a push on the cable core 124 which is immediately transferred to the actuator pin 104 causing it to travel from its normal position as shown in FIGURE 2 to the position shown in FIGURE 10. During this movement actuator pin 104 strikes the side face 88 of release lever 84 and thereby rotates lever 84 which by cam action of its cam face 86 against the cam face 78 rotates the catch bracket 58 which pulls the lock pin 65 out of the pocket 66 of slot 67 to release the seat for rotation. At that moment the mechanism is in the position shown in FIGURE 10. Immediately upon release of the lock pin 65 the tension spring 56 swings the seat 28 outwardly as previously described.

The outward swinging movement of the seat also causes the pivot bracket 62 to rotate due to its attachment to the seat and thereby may overtake the movement of the actuator pin 104 depending on the speed with which the door is being opened. The mechanism assumes then a position shown in FIGURE 11 in which the inner end of slot 114 of the swivel bracket 62 abuts against the pin 104. This prevents further swivel movement of the seat unless the door 16 is opened wider to rotate the lever 144 further in a counterclockwise direction. Due to its pivoted attachment at 60 to the swivel bracket 62, the catch bracket 58 is also displaced but is likewise guided in its movement by means of the lock pin 65 which now travels in the slot 67. Further opening movement of the door 16 causes the seat and swivel bracket 62 to move with the pin 104 until the actuator pin 104 abuts the outer end of lower slot 90 at which time the vehicle door will be completely opened and the seat 28 swung to the limit of its predetermined arc. Actuator pin 104 is then in a position where it abuts the inner end of slot 114 and the outer end of slot 90 and lock pin 65 abuts the outer end of slot 67.

It will be noted from FIGURE 11 that the cam face 86 of release lever 84 is designed to clear the remainder of the catch bracket 58 after initial engagement with cam face 78 thereof during the entire movement.

The seat may afterwards be manually swung inwardly when the door is desired to be left open, or a person may seat himself and swing inwardly. In both of these conditions the release mechanism is returned to normal position until the lock pin 65 falls into the pocket 66 of slot 67 under the influence of the spring 70. If the door remains open, the actuator pin 104 remains in its extreme position, that is abutting the ends of slots 90 and 114, respectively.

Upon closing the vehicle door 16 under the above conditions the roller 154 on the door hinge 158 will rotate the cam lever 144 clockwise as viewed in FIGURES 7 and 10 thereby exerting a pull on cable 120 which causes the actuator pin 104 to return to its initial position illustrated in FIGURE 2. It will be noted that the pin 104 again actuates the release mechanism on its return movement, however, due to the weight of a person sitting on the seat, outward swinging movement will be prevented and after the pin 104 passes the cam area the lock pin 65 will fall back into the pocket 66 due to the catch spring 70.

Under normal conditions which exist when a person is seated on the swung-out seat and desires to swing inwardly and simultaneously close the door the pull on cable 120 assists in swinging the seat inwardly due to the actuator pin 104 which abuts against the inner end of slot 114 and tends to turn the swivel bracket 62 and thereby the seat.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A seat for a vehicle having a side doorway and a door pivoted for movement between closed and open positions for said doorway, said seat comprising a support, a seat section mounted for pivotal movement on said support between a forwardly facing position and a laterally outwardly facing position wherein it partially projects through said doorway, resilient means urging said seat section toward said outwardly facing position, a releasable latch for retaining said seat section in said forwardly facing position comprising a catch member pivoted on said seat section and coacting latching means therefor on said support, and a door-connected trip mechanism for releasing said latch as said door is opened comprising an actuator slidably guided on said support and connected to be positively moved by opening of said door, and a release lever pivoted on said support and spring biased into engagement with said actuator, said lever being interposed and comprising a motion transmitting connection between said actuator and said catch member, whereby upon opening of said door said actuator swings said lever to displace said catch member from said latching means and permit said resilient means to swing said seat section about its pivot toward outwardly facing position.

2. A seat for a vehicle having a side doorway and a door pivoted for movement between closed and open positions for said doorway, said seat comprising a front seat section mounted for pivotal movement between a forwardly facing position and a laterally outwardly facing position wherein it partially projects through said doorway, means urging said seat section toward said outwardly facing position, a releasable latch for retaining said seat section in said forwardly facing position, a trip mechanism for releasing said latch, a push-pull cable connected at opposite ends to said trip mechanism and to said door and arranged to actuate said trip mechanism to release said latch as said door is opened, cooperating means on the trip mechanism end of said cable and said seat section for limiting the extent of outward movement of the seat section to correspond to opening movement of the door and further coacting with means on the support to arrest outward movement of the seat section when the door has been fully opened, said last named means providing a lost-motion connection between said cable and said seat section and operable to move said seat section to said forwardly facing position as said door is closed.

3. In a front seat assembly for a passenger vehicle having a side doorway with a pivoted door for opening or closing the doorway, a swivel seat section in said assembly adjacent the doorway adapted to swing between a forwardly facing position and a laterally outwardly facing position wherein it partially projects through said doorway, spring means constantly biasing said seat section toward said outwaardly facing position, means for releasably latching said seat section in said forwardly facing position comprising a relatively stationary member having a fixed latch element, a pair of coacting latch elements adjacently pivotally mounted on parallel axes on the stationary member and seat section respectively with one of said movable latch elements having a part for releasable locking engagement with said fixed latch element, and means automatically operated by opening and closing movements of said door operatively connected to said other movable latch element, said last means comprising a member slidably connected to said stationary member and operatively connected directly to said other movable latch element, and a push pull cable connection between said door and said slidable member.

4. A front seat for a vehicle having a floor, a side doorway and a door pivoted for movement between closed and open positions for said doorway, said seat comprising a seat section mounted for pivotal movement on a floor mounted support between a forwardly facing position and a laterally outwardly facing position wherein it partially projects through said doorway, spring means urging said seat section toward said outwardly facing position, a bracket rigid with said seat section and movable therewith, a latch member pivotally carried by said bracket and having a part engageable with a surface on said support to retain said seat section against pivotal movement, a door-connected trip member slidably guided on said bracket adjacent said latch member and adapted to be shifted by opening movement of said door, and motion transmitting means operably connected between said trip member and said latch member for moving said part out of engagement with said surface to permit pivotal movement of said seat section by said spring means when said door is opened.

5. A front seat for a vehicle having a floor, a side doorway and a door pivoted for movement between closed and open positions for said doorway, said seat comprising a seat section mounted for pivotal movement on a floor mounted support between a forwardly facing position and a laterally outwardly facing position wherein it partially projects through said doorway, spring means urging said seat section toward said outwardly facing position, a bracket rigid with said seat section and movable therewith, a latch member pivotally carried by said bracket and having a part engageable with a surface on said support to retain said seat section against pivotal movement, a release lever pivoted on said support adjacent said latch member and adapted to engage said latch member, a door-connected trip member slidable along slots in said support and said bracket, means resiliently biasing said lever against said trip member, said trip member acting to swing said lever against said latch member to move said part out of engagement with said surface to permit pivotal movement of said seat section by said spring means when said door is opened.

6. In the front seat defined in claim 5, said slots being arranged in substantial vertical superposition, with the bracket slot coacting with said trip member to progressively limit outward swing of the seat section to correspond with the degree of door opening, and said support slot coacting with the trip member to arrest outward swing of the seat section when the door is fully open.

7. A front seat for a vehicle having a floor, a side doorway and a door pivoted for movement between closed and open positions for said doorway, said seat comprising a seat section mounted for pivotal movement on a floor mounted support between a forwardly facing position and a laterally outwardly facing position wherein it partially projects through said doorway, spring means urging said seat section toward said outwardly facing position, a plate rigid with said support, a bracket rigid with said seat and movable therewith, a latch member pivotally carried by said bracket on an axis parallel to the seat section pivot and having a part slidable in a slot in said plate and engageable with a surface on said plate to retain said seat against pivotal movement, and a door-connected trip mechanism operably connected to said latch member for moving said part out of engagement with said surface to permit pivotal movement of said seat section by said spring means when said door is opened.

References Cited in the file of this patent
UNITED STATES PATENTS

| | | |
|---|---|---|
| 1,682,989 | Smelker | Sept. 4, 1928 |
| 2,036,118 | Carr | Mar. 31, 1936 |
| 2,618,312 | Bradley | Nov. 18, 1952 |
| 2,822,858 | Mussler | Feb. 11, 1958 |
| 2,874,993 | Probst | Feb. 24, 1959 |
| 2,992,852 | Loofbourrow et al. | July 18, 1961 |